United States Patent
King et al.

(10) Patent No.: US 7,957,040 B2
(45) Date of Patent: Jun. 7, 2011

(54) SCAN BAR FOR SCANNING MEDIA SHEET IN IMAGE SCANNING DEVICE AND METHOD THEREOF

(75) Inventors: Anthony Michael King, Lexington, KY (US); Matthew Ryan Lashinsky, Lexington, KY (US); Mark Eric Miller, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 250 days.

(21) Appl. No.: 12/250,100

(22) Filed: Oct. 13, 2008

(65) Prior Publication Data

US 2010/0091340 A1    Apr. 15, 2010

(51) Int. Cl.
*H04N 1/04* (2006.01)
(52) U.S. Cl. ........ 358/483; 358/482; 358/486; 358/488; 358/497; 358/474; 358/487
(58) Field of Classification Search ................... 358/483, 358/482, 486, 474, 497, 494, 496, 514, 512, 358/513, 505, 506, 488, 487; 250/208.1, 250/234–236, 239, 216; 399/211; 382/312, 382/318, 319
See application file for complete search history.

(56) References Cited

U.S. PATENT DOCUMENTS

| 5,489,993 | A | * | 2/1996 | Ito et al. ........................ 358/482 |
| 6,009,214 | A | * | 12/1999 | Suggs ............................ 382/312 |
| 6,624,914 | B1 | * | 9/2003 | Hendrix et al. ............... 358/484 |
| 7,471,428 | B2 | * | 12/2008 | Ohara et al. ................... 358/497 |
| 2006/0061835 | A1 | * | 3/2006 | Inada ............................ 358/474 |
| 2006/0109524 | A1 | * | 5/2006 | Schnitzlein ................... 358/474 |
| 2007/0070444 | A1 | * | 3/2007 | Sakakibara et al. .......... 358/474 |
| 2009/0103149 | A1 | * | 4/2009 | Sakakibara et al. .......... 358/514 |

* cited by examiner

*Primary Examiner* — Cheukfan Lee
(74) *Attorney, Agent, or Firm* — Justin M. Tromp; William F. Esser

(57) ABSTRACT

A scan bar for scanning a media sheet in an image scanning device and a method for scanning the media sheet in the image scanning device are disclosed. The scan bar comprises a sensor arrangement and a lens arrangement. The sensor arrangement comprises a first sensor region and a second sensor region. Light reflected from the media sheet is focused by the lens arrangement onto the sensor arrangement. Each of the first sensor region and the second sensor region is capable of generating image data corresponding to the media sheet from the focused light received from the lens arrangement for scanning the media sheet. The image data generated by the first sensor region is of relatively higher resolution than image data generated by the second sensor region.

20 Claims, 5 Drawing Sheets

SCAN BAR FOR SCANNING MEDIA SHEET IN IMAGE SCANNING DEVICE AND METHOD THEREOF

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The disclosure relates generally to image scanning devices, and, more particularly, to a scan bar used for scanning a media sheet in an image scanning device.

2. Description of the Related Art

Image scanning devices, such as scanners, are typically used for scanning information provided on media sheets such as papers, transparencies, picture negatives and the like. Scanning the information provided on a media sheet refers to converting the information provided on the media sheet into a digital image. The digital image may then be viewed on a screen of a data processing device such as a personal computer, a laptop, a personal digital assistant and the like.

The image scanning devices, typically, include a platen and a scan bar for scanning the media sheets. The media sheet is placed on the platen such that a side of the media sheet including the information to be scanned faces the platen. The scan bar is positioned adjacent to the platen and typically includes a light source, a lens and a sensor module. The light source illuminates a portion of the media sheet and the light reflected from the portion of the media sheet impinges on the lens. The lens may be configured to focus the light onto the sensor module. The light focused by the lens onto the sensor module includes an optical image of the information included in the portion of the media sheet. The sensor module converts the received focused light, i.e. the optical image, into a digital image, thereby scanning the information included in the portion of the media sheet. The media sheet or the scan bar may be moved relative to each other for scanning all of the information on the media sheet.

Scan bars of the image scanning devices are typically available in one of a high resolution scan mode, such as 4800 pixels per inch (ppi), or, a low resolution scan mode such as 1200 ppi, 600 ppi, 300 ppi and 200 ppi. Scanning the media sheet at the high resolution scan mode provides higher quality scans, i.e., better digital image quality and improved clarity, whereas, scanning the media sheet at the low resolution scan mode provides relatively poorer scan quality than scanning at the high resolution scan mode. Potential customers of the image scanning devices typically prefer an image scanning device configured with a scan bar capable of scanning at the high resolution scan mode.

Scanning of media sheets, such as an 8.5 inches×11 inches document or a 4 inches×6 inches document using a scan bar at high resolution scan mode, such as 4800 ppi, may result in several gigabytes of file size of the digital image. Such a large file size of the digital image of the document may render the high resolution scan mode of the scan bar, in the image scanning device, to be usable only for limited applications.

Moreover, most scanning operations, i.e. scanning of the media sheets, are performed at default settings of the image scanning devices. The default settings of the image scanning devices are typically set at low resolutions such as 200 or 300 ppi. Scanning of the media sheets by scan bars capable of scanning at the high resolution scan mode, such as 4800 ppi, at default settings have revealed a degradation of image quality of the digital images captured by the image scanning devices. Such degradation of the image quality may be due to smaller sensors configured in a sensor module of the scan bar. Further, the degradation of image quality may be due to limitations of lenses present in the scan bar of the image scanning device that result in increased signal noises, reduced dynamic range and lower spatial frequency response.

Based on the foregoing, there is a need for a scan bar in an improved image scanning device.

SUMMARY OF THE DISCLOSURE

Embodiments of the present disclosure overcome shortcomings in prior image scan systems and thereby satisfy a need for an image scan system capable of scanning media in a high resolution scan mode as well as a low resolution scan mode. When in the low resolution scan mode, such embodiments may scan media sheets at the default settings (i.e. relatively lower resolution) while substantially precluding degradation in digital image quality. While operating in the high resolution scan mode, embodiments of the present disclosure maintain digital image file sizes to useable limits.

In one aspect, the present disclosure provides a scan bar for scanning a media sheet in an image scanning device. The scan bar may include a sensor arrangement and a lens arrangement. The sensor arrangement may include a first sensor region and a second sensor region. The lens arrangement is capable of focusing light reflected from the media sheet onto the sensor arrangement. Each of the first sensor region and the second sensor region is capable of generating image data corresponding to the media sheet from the focused light received from the lens arrangement for scanning the media sheet. The image data generated by the first sensor region is of relatively higher resolution than image data generated by the second sensor region.

In another aspect, the present disclosure provides an image scanning device having a scan bar and a motion mechanism for scanning a media sheet. The scan bar may include a sensor arrangement and a lens arrangement. The sensor arrangement may include a first sensor region and a second sensor region. The lens arrangement is capable of focusing light reflected from the media sheet onto the sensor arrangement. Each of the first sensor region and the second sensor region is capable of generating image data corresponding to the media sheet from the focused light received from the lens arrangement for scanning the media sheet. The image data generated by the first sensor region is of relatively higher resolution than image data generated by the second sensor region. The motion mechanism moves one of the scan bar and the media sheet relative to the other of the scan bar and the media sheet.

Further, in another aspect, the present disclosure provides a method for scanning a media sheet by a scan bar in an image scanning device. A light reflected from the media sheet is received by a lens arrangement of the scan bar. The received light is focused by the lens arrangement onto a sensor arrangement of the scan bar. The sensor arrangement may include a first sensor region and a second sensor region. Each of the first sensor region and the second sensor region is capable of generating the image data from the focused light received from the lens arrangement. Image data is generated from the focused light received by the sensor arrangement from the lens arrangement for scanning the media sheet. Image data generated by the first sensor region is of relatively higher resolution than image data generated by the second sensor region for scanning the media sheet.

Thus, providing the sensor arrangement in the scan bar configured with the first sensor region and the second sensor region capable of generating image data at relatively higher and lower resolutions, respectively, enables a user to configure the image scanning device to generate image data of a desired target image resolution and a target image file size. Further, the scan bar of the image scanning device configured with the high resolution mode may still be operated at default settings, i.e. relatively lower resolution, precluding any degradation in picture quality. Moreover, the first sensor region capable of generating image data of relatively higher resolution may be utilized to scan media sheets of relatively smaller size such as coins, negatives, stamps, slides and the like, thereby maintaining digital image file sizes to useable limits.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the disclosure taken in conjunction with the accompanying drawings, wherein.

DETAILED DESCRIPTION

Figure 1A:
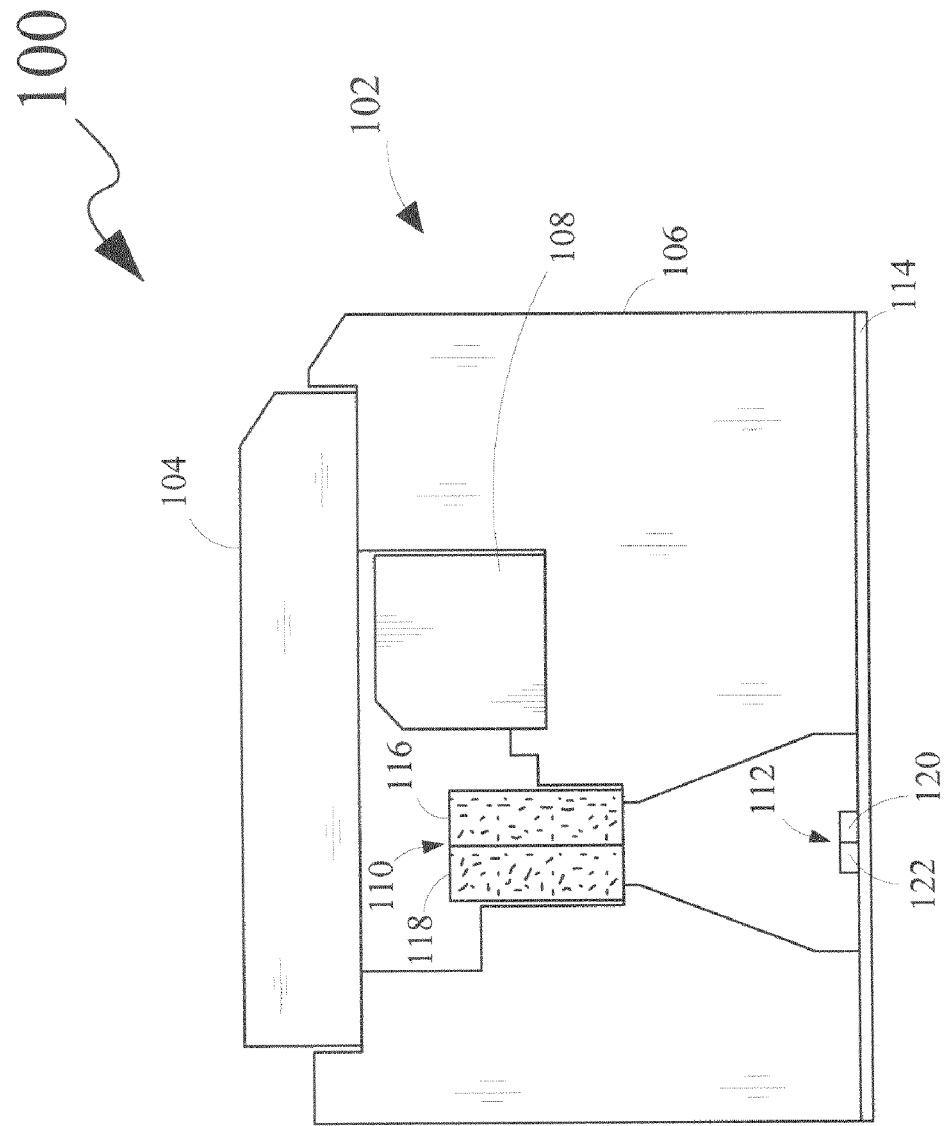
FIG. 1A is a schematic depiction of a side view of a scanning assembly of an image scanning device for scanning of a media sheet in the image scanning device embodying the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including" or "having" and variations thereof herein is meant to encompass the items listed thereafter and equivalents thereof as well as additional items.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure. Furthermore, and as described in subsequent paragraphs, the specific mechanical configurations illustrated in the drawings are intended to exemplify embodiments of the present disclosure and that other alternative mechanical configurations are possible.

The present disclosure provides a scan bar, an image scanning device and a method for scanning a media sheet by the scan bar in the image scanning device. The scan bar may include a sensor arrangement and a lens arrangement. The sensor arrangement may include a first sensor region and a second sensor region. Light reflected from the media sheet is focused by the lens arrangement onto the sensor arrangement. Each of the first sensor region and the second sensor region is capable of generating image data corresponding to the media sheet from the focused light received from the lens arrangement for scanning the media sheet. The image data generated by the first sensor region is of relatively higher resolution than image data generated by the second sensor region, Referring now to FIGS. 1A and 1B, a side view of a scanning assembly 100 of an image scanning device (not shown) and an exploded perspective view of scanning assembly 100 are depicted respectively, for scanning a media sheet in accordance with an embodiment of the present disclosure. Further, description of FIGS. 1A and 1B also describe a method for scanning a media sheet in the image scanning device. It will be evident to those skilled in the art that examples of the image scanning device may include but are not limited to scanners, all-in-one printers and copiers.

Figure 1B:
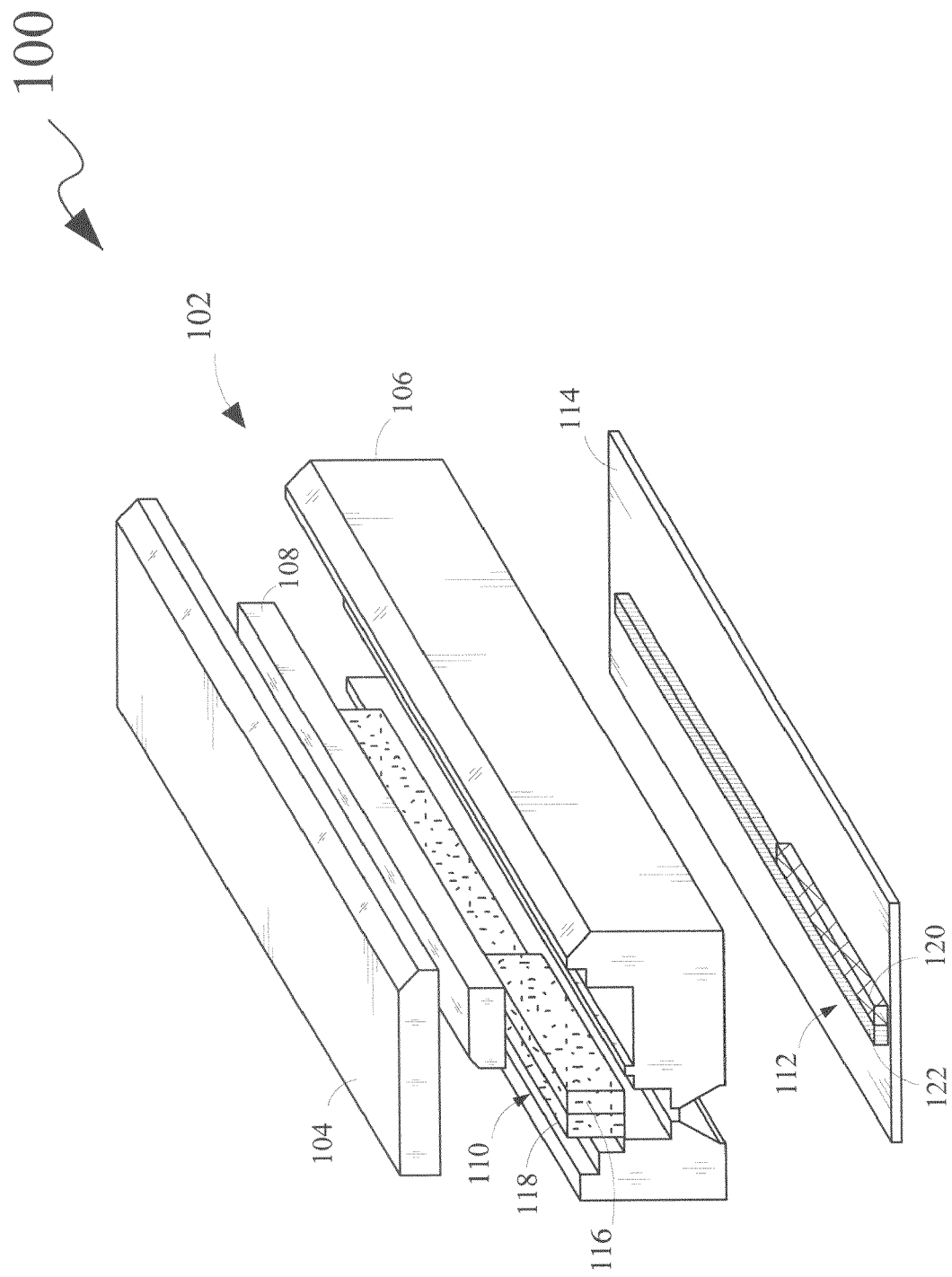
FIG. 1B is a schematic depiction of an exploded perspective view of the scanning assembly of the image scanning device embodying the present disclosure.

Scanning assembly 100 of the image scanning device includes a scan bar 102, a platen 104 and a motion mechanism (not shown). Scan bar 102 includes a housing 106 for accommodating a light source 108, a lens arrangement 110, a sensor arrangement 112 and a circuitry board 114. In FIGS. 1A and 1B, platen 104 may be composed of transparent glass material and is depicted to be disposed on housing 106 on a surface opposite to circuitry board 114. However, it will be evident to those skilled in the art that scan bar 102 may be disposed on platen 104 when platen 104 is composed of an opaque material. A media sheet (not shown) to be scanned is placed on platen 104 of scanning assembly 100. Examples of media sheet may include but are not limited to a sheet of paper, picture negatives, transparencies and coins. The motion mechanism may impart motion to either scan bar 102 relative to platen 104 and the media sheet to be scanned, or to the media sheet relative to scan bar 102.

Light source 108 configured within housing 106 may be positioned adjacent to platen 104, such that light source 108 is capable of illuminating the media sheet placed on platen 104 for reflecting light from the media sheet onto lens arrangement 110. Examples of light source 108 may include a fluorescent bulb, an external electrode xenon fluorescent lamp, Light Emitting Diodes (LEDs) and the like. Light reflected from the media sheet may be received by lens arrangement 110.

Figure 2:
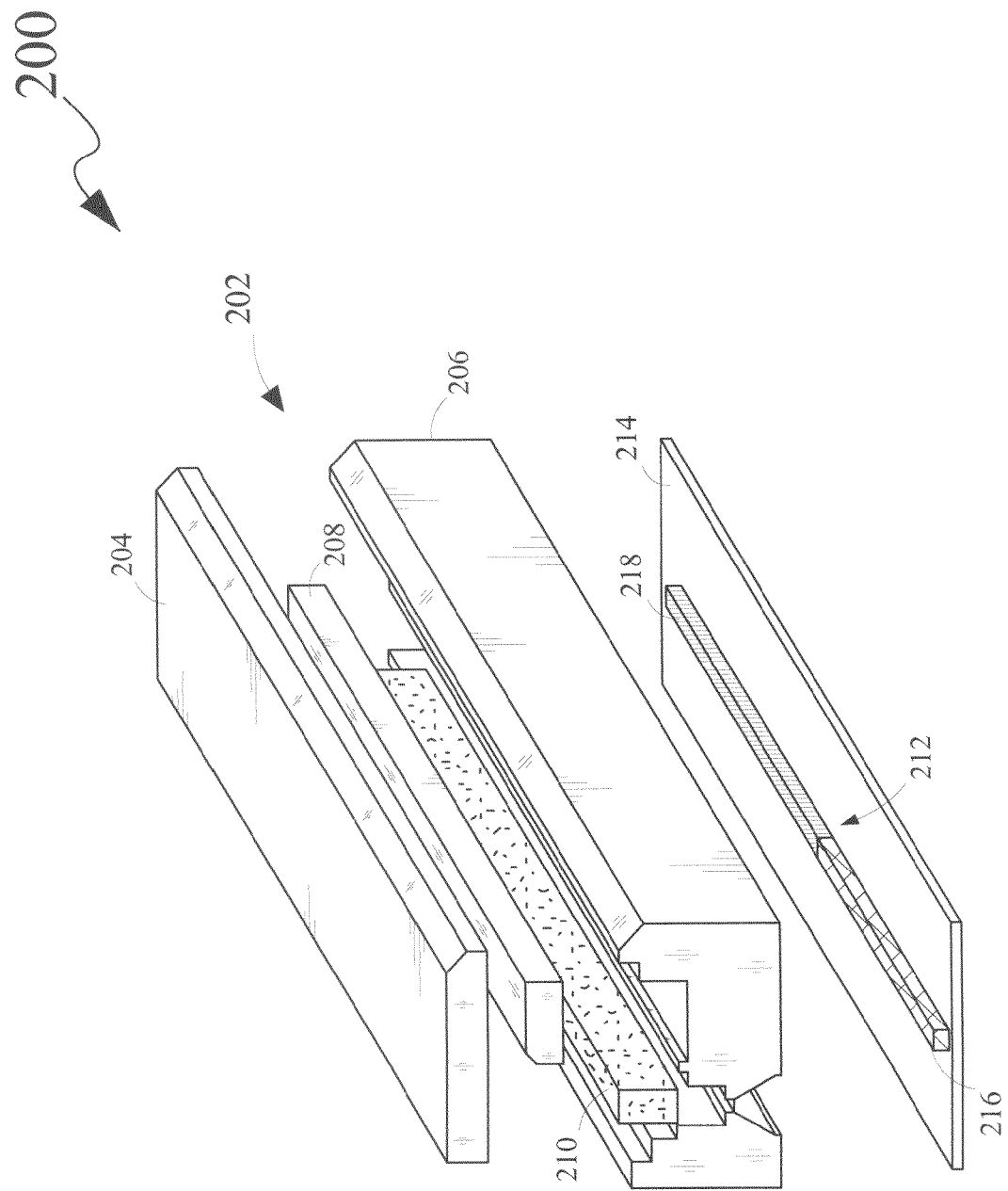
FIG. 2 is a schematic depiction of an exploded perspective view of a scanning assembly in an image scanning device for scanning of a media, sheet according to another embodiment of the present disclosure.

Lens arrangement 110 may be configured to focus the received light reflected from the media sheet onto sensor arrangement 112. Lens arrangement 110 includes a first lens component 116 and a second lens component 118. In FIGS. 1A and 1B, first lens component 116 is positioned adjacent to second lens component 118 within housing 106. Further, first lens component 116 and second lens component 118 are positioned parallel to each other and extend in a longitudinal direction of scan bar 102. A length of first lens component 116 may be configured to be less than a length of second lens component 118 in the longitudinal direction of scan bar 102 as depicted in FIG. 1B. First lens component 116 and second lens component 118 receive light reflected from the media sheet and are capable of focusing the received light onto sensor arrangement 112. It is understood that though lens arrangement 110 is depicted to include first lens component 116 and second lens component 118, lens arrangement 110 may include a single lens in optical communication with first sensor region 120 and second sensor region 122, as depicted in FIG. 2.

Sensor arrangement 112 of scan bar 102 is disposed on circuitry board 114. Sensor arrangement 112 includes a first sensor region 120 and a second sensor region 122. In one embodiment of the present disclosure, first lens component 116 is configured to be in optical communication with first sensor region 120, and, second lens component 118 is configured to be in optical communication with second sensor region 122.

Each of first sensor region 120 and second sensor region 122 is capable of generating image data from focused light received from lens arrangement 110. Further, image data generated by first sensor region 120 is of relatively higher resolution than image data generated by second sensor region 122. In one embodiment of the present disclosure, the image data generated by first sensor region 120 has a resolution, hereinafter referred to as a first image resolution, which is at least twice the resolution, hereinafter referred to as a second image resolution, of the image data generated by second sensor region 122. In one embodiment of the present disclosure, first sensor region 120 may be configured as a silicon bar capable of generating image data at 4800 ppi resolution (first image resolution), and second sensor region 122 may be configured as a silicon bar capable of generating image data at 1200 ppi resolution (second image resolution). In another embodiment of the present disclosure, the second image resolution may be one of a 1200 ppi, 600 ppi, 300 ppi and 200 ppi.

In FIG. 1B, first sensor region 120 is depicted to be positioned parallel to second sensor region 122 in a longitudinal direction of scan bar 102. Moreover, a length of first sensor region 120 is depicted to be less than a length of second sensor region 122 in the longitudinal direction of scan bar 102. In one embodiment of the present disclosure, first sensor region 120 may be configured to extend up to about 35 millimeters along the longitudinal direction of scan bar 102. However, it will be evident to those skilled in the art, that different configurations of shapes, sizes and alignments of first sensor region 120 relative to second sensor region 122 are possible for receiving light focused from lens arrangement 110. Further, it will be evident to those skilled in the art that first sensor region 120 and second sensor region 122 may be composed of silicon material of varied compositions for generating the image data of the first image resolution and the second image resolution respectively.

In one embodiment of the present disclosure, lens arrangement 110 is capable of focusing the reflected light received from the media sheet onto at least one of first sensor region 120 and second sensor region 122 based upon a target image resolution. Lens arrangement 110 may focus the reflected light received from the media sheet onto first sensor region 120 when the target image resolution is the first image resolution such as, 4800 ppi. Further, lens arrangement 110 may focus the reflected light received from the media sheet onto second sensor region 122 when the target image resolution is the second image resolution, such as 1200 ppi or the like. The target image resolution may be an image resolution desired by a user of the image scanning device. The user may input the target image resolution through a user interface that may be provided on the image scanning device.

In another embodiment of the present disclosure, lens arrangement 110 is capable of focusing the reflected light received from the media sheet onto at least one of first sensor region 120 and second sensor region 122 based upon a target image file size. The target image file size may be, for example, an image file size defined by the user. Lens arrangement 110 may focus the reflected light received from the media sheet onto first sensor region 120 for scanning a media sheet of relatively small size, such as stamp. A higher scan resolution, i.e., the first image resolution, may be preferred by a user of the image scanning device for scanning the media sheet of relatively smaller size, for maintaining image quality and the image file size within useable limits. For scanning the media sheets of relatively larger size such as an A4 sheet of paper, a relatively lower scan resolution, such as the second image resolution, may be preferred for maintaining the file size to a useable limit. The user may accordingly define the target image file size, such that one of first sensor region 120 and second sensor region 122 may be utilized for generating image data corresponding to the media sheet. Accordingly, a presence of first sensor region 120 and second sensor region 122 in sensor arrangement 112 enables the user to generate image data corresponding to the media sheet at manageable file sizes. Further, such sensor arrangement 112 reduces signal noise, increases dynamic range and spatial frequency response. The user may input the target image file size through a user interface that may be provided on the image scanning device.

Sensor arrangement 112 and, more specifically, first sensor region 120 and second sensor region 122 is disposed on circuitry board 114. It is understood that circuitry board 114 may be, for example, a printed circuit board (PCB) or such circuit board including requisite control circuitry (not shown) capable of receiving the image data generated by one of first sensor region 120 and second sensor region 122. The received image data may then be transmitted as digital pulses to a data processing device for generating a corresponding digital image of the media sheet scanned.

The control circuitry on circuitry board 114 may be configured to control functioning of first sensor region 120 and second sensor region 122. For instance, the control circuitry may be configured to receive user input and accordingly configure at least one of first sensor region 120 and second sensor region 122. In one embodiment of the present disclosure, the control circuitry is capable of selectively configuring first sensor region 120 to provide the image data at a first image resolution, based upon user input. In another embodiment of the present disclosure, first sensor region 120 may be configured for scanning at 4800 ppi and also configured to perform scanning operation at least one of a 1200 ppi, 600 ppi and 300 ppi. In one embodiment of the present disclosure, the control circuitry includes mode lines for receiving user input for target image resolution and may accordingly configure one of first sensor region 120 and second sensor region 122 for generating image data corresponding to the media sheet. In another embodiment of the present disclosure, control circuitry includes clock lines and analog out lines coupled to sensor arrangement 112 for initiating and terminating a scanning operation. Further, the clock lines and the analog out lines may be provided for each of first sensor region 120 and second sensor region 122 or may be shared between first sensor region 120 and second sensor region 122. In one embodiment of the present disclosure, the control circuitry may be further capable of controlling lens arrangement 110 to focus the reflected light received from the media sheet onto at least one of first sensor region 120 and second sensor region 122.

During a scanning operation in the image scanning device, a media sheet is disposed on platen 104 such that a side of the media sheet including the information to be scanned is disposed on platen 104. The motion mechanism of the image scanning device is used for moving one of scan bar 102 and the media sheet relative to the other of scan bar 102 and the media sheet. It is understood that one of scan bar 102 and the media sheet is moved relative to one another for sweeping across the media sheet for scanning of the contents appearing on the media sheet. In one embodiment of the present disclosure, the motion mechanism moves platen 104 with respect to a stationary scan bar 102. In such an instance, when platen 104 moves, scan bar 102 is utilized to capture an optical image associated with the media sheet. In another embodiment of the present disclosure, the motion mechanism moves scan bar 102 with respect to a stationary platen 104. The image data generated by scan bar 102 and, more specifically, one of first sensor region 120 and second sensor region 122 of scan bar 102, is transmitted to a data processing device (not shown) communicably coupled with the image scanning device for displaying a digital image corresponding to the media sheet.

It is understood that the motion mechanism may include a motor-driven drive rolls, or such mechanical configuration known in the art, for moving one of scan bar 102 and the media sheet relative to the other of scan bar 102 and the media sheet. It is further understood that though the image scanning device is depicted in FIGS. 1A and 1B to include scanning assembly 100, the image scanning device may include a controller, a user interface, drive rolls for driving media sheet in the image scanning device and one or more motors for driving the drive rolls. The controller may include, for example, a processor unit and an associated memory and may be formed as one or more Application Specific Integrated Circuits (ASICs). Memory may be, for example, a random access memory (RAM), a read only memory (ROM), and/or a non-volatile RAM (NVRAM). Alternatively, memory may be in form of a separate electronic memory (e.g., RAM, ROM, and/or NVRAM), a hard drive, a CD or DVD drive, or any memory device convenient for use with the controller. The controller may be configured to process input received using the user interface and provide instructions to control circuitry for scanning the media sheets.

As explained in conjunction with FIGS. 1A and 1B, scan bar 102 may be configured to include various configurations of sensor arrangement 112 and lens arrangement 110 for scanning the media sheet in the image scanning device. One such configuration is explained in conjunction with FIG. 2.

FIG. 2 depicts an exploded perspective view of a scanning assembly 200 in an image scanning device (not shown) for scanning a media sheet in accordance with another embodiment of the present disclosure. Scanning assembly 200, such as scanning assembly 100 explained in conjunction with FIGS. 1A and 1B, includes a scan bar 202 and a platen 204. Scan bar 202 includes a housing 206 accommodating a light source 208, a lens 210, a sensor arrangement 212 and circuitry board 214. A media sheet to be scanned is placed on platen 204. Scanning assembly 200 further includes a motion mechanism (not shown), such as the motion mechanism explained in conjunction with FIGS. 1A and 1B, for moving one of scan bar 202 and the media sheet relative to the other of scan bar 202 and the media sheet for scanning the media sheet.

Light source 208 illuminates the media sheet for reflecting light from the media sheet onto lens 210. Lens 210 is capable of receiving the light reflected from the media sheet and focusing the light onto sensor arrangement 212. Lens 210 may extend in longitudinal direction of scan bar 202 as depicted in FIG. 2. Sensor arrangement 212 includes a first sensor region 216 and a second sensor region 218, which may be similar in structure and function to first sensor region 120 and second sensor region 122, respectively. In FIG. 2, first sensor region 216 and second sensor region 218 are disposed on circuitry board 214 and are positioned in a series arrangement, i.e., in an end-to-end fashion, along a longitudinal direction of scan bar 202. Moreover, a length of first sensor region 216 is depicted to be less than a length of second sensor region 218 in the longitudinal direction of scan bar 202.

Each of first sensor region 216 and second sensor region 218 is capable of generating image data from focused light received from lens 210. Further, image data generated by first sensor region 216 is of relatively higher resolution than image data generated by second sensor region 218. In one embodiment of the present disclosure, the image data generated by first sensor region 216 has a resolution which is at least twice the resolution of the image data generated by second sensor region 218. In one embodiment of the present disclosure, first sensor region 216 may be a bar or strip of silicon sensor elements or the like capable of generating image data at 4800 ppi resolution, and second sensor region 218 may be a bar or strip of silicon sensor elements or the like capable of generating image data at least one of 1200 ppi, 600 ppi, 300 ppi and 200 ppi. In another embodiment of the present disclosure, first sensor region 216 and second sensor region 218 may be integrally formed as a unitary device, such as a single bar or strip of silicon sensor elements or the like.

Lens 210 is configured to be in optical communication with first sensor region 216 and second sensor region 218 and is capable of focusing the reflected light received from the media sheet onto at least one of first sensor region 216 and second sensor region 218 based upon one of the target image resolution and the target image file size, as explained in conjunction with FIGS. 1A and 1B. Circuitry board 214 may be configured similar to circuitry board 114 and may include requisite control circuitry for controlling the operation of first sensor region 216 and second sensor region 218 as explained in conjunction with FIGS. 1A and 1B.

Light reflected from the media sheet may be received by lens 210 which may then focus the received reflected light onto one of first sensor region 216 and second sensor region 218 based on one of the target image resolution and the target image file size. In one embodiment of the present disclosure, a user of the image scanning device may specify one of the target image resolution and the target image file size at the user interface of the image scanning device. Based on the user input, lens 210 may focus light onto first sensor region 216 and second sensor region 218. The user input may also be used by the control circuitry for configuring one or both of first sensor region 216 and second sensor region 218 for generating image data at a resolution desired by the user. Alternatively, a surface of platen 204 may include markings indicating sections being scanned at high resolution, i.e. by first sensor region 216, and, at low resolution, i.e. by second sensor region 218. The markings indicating sections for scanning at one of high resolution and low resolution are explained in conjunction with FIG. 3.

Figure 3:
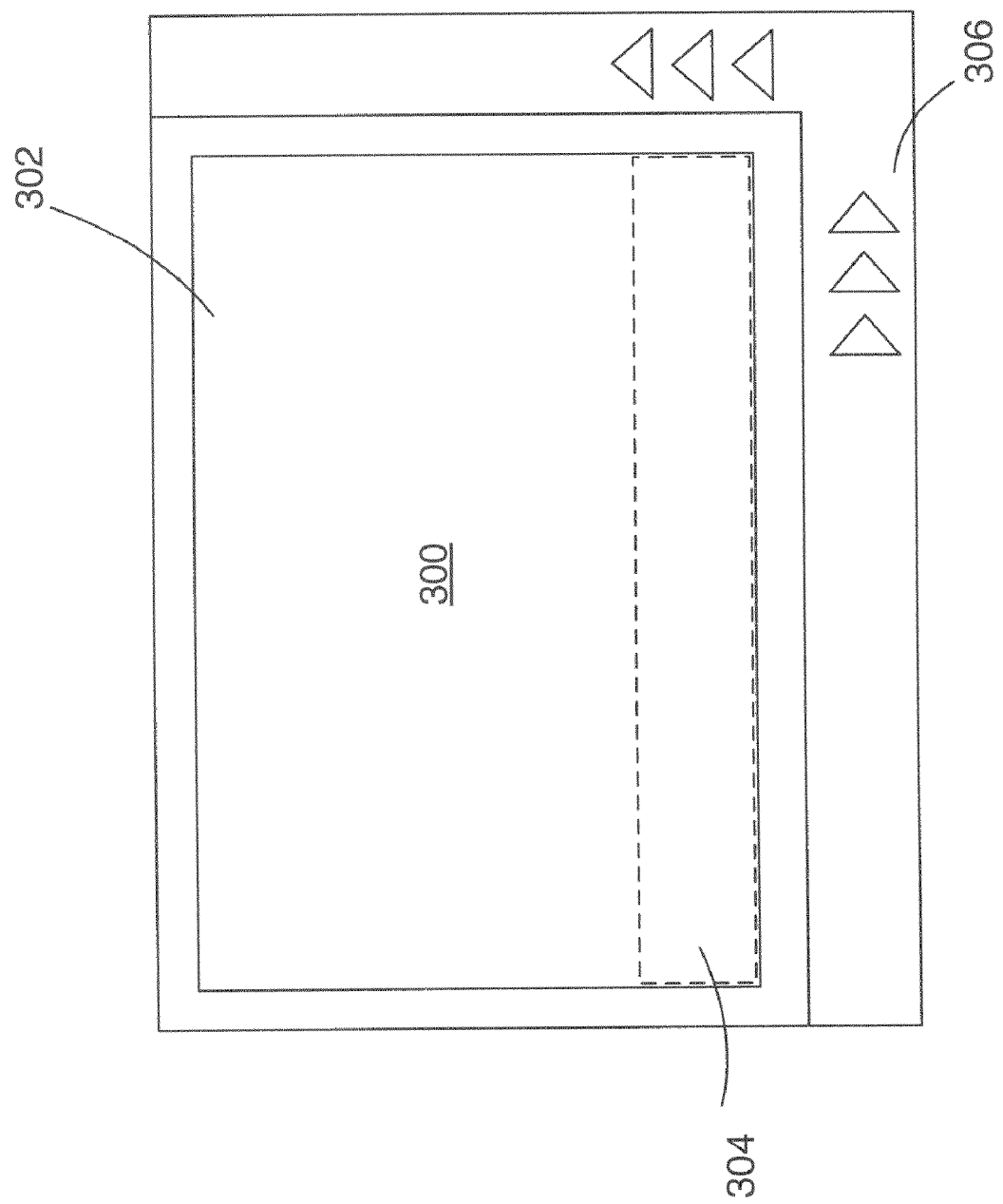
FIG. 3 is a schematic depiction of a top view of an exemplary platen of an image scanning device embodying the present disclosure.

FIG. 3 depicts a top view of a surface 300 of an exemplary platen for receiving a media sheet thereon, in accordance with an embodiment of the present disclosure. As explained in conjunction with FIGS. 1A, 1B and 2, the media sheet may be disposed on surface 300 of the platen (such as platen 204 or platen 104), such that a side of the media sheet including information to be scanned is disposed on surface 300.

Surface 300 may include a first set of marking 302 for outlining an area capable of being scanned at a relatively lower resolution such as 1200 ppi. More specifically, first set of marking 302 outlines an area being scanned by a second sensor region (such as second sensor region 218 or second sensor region 122). In one embodiment of the present disclosure, first set of marking 302 outlines an A4 sheet size area. Further, surface 300 includes a second set of marking 304 for outlining an area capable of being scanned at relatively higher resolution, such as 4800 ppi. More specifically, second set of marking 304 outlines the area being scanned by a first sensor region (such as first sensor region 216 or first sensor region 120). It is understood that though first set of marking 302 and second set of marking 304 are depicted to outline areas on surface 300, first set of marking 302 and/or second set of marking 304 may preclude outlining scan areas on surface 300 and instead depict only corners of scan areas for scanning media sheets at relatively lower resolution and at relatively higher resolution, respectively. In one embodiment of the present disclosure, second set of marking 304 outlines an area with 35 millimeter width and may be used for scanning media sheets of relatively smaller size such as stamps, coins, negatives, slides and the like.

Further, a desired media sheet orientation may be indicated using orientation markings 306, disposed adjacent to surface 300. Furthermore, a user interface (not shown) may be provided for receiving a user input such as the target image resolution and the target image file size as explained in conjunction with FIGS. 1A, 1B and 2. Thus, markings such as the first set of marking 302 and second set of marking 304 may be used for placing media sheets for scanning the media sheets at desired image resolution. Alternatively, the target image resolution or the target image file size may be input using the controls provided on the user interface for scanning the media sheets.

A scan bar, such as scan bar 102 and scan bar 202, may be referred to as a hybrid scan bar as the scan bar includes a sensor arrangement configured with a first high resolution sensor region, such as first sensor region 120 or first sensor region 216, and a second lower resolution sensor region, such as second sensor region 122 or a second sensor region 218. The hybrid scan bar enables the user to configure the image scanning device to generate image data of desired target image resolution and target image file size. Moreover, the scan bar of the image scanning device configured with the high resolution mode may still be operated at default settings, i.e. at relatively lower resolution precluding any degradation in picture quality. Further, the first sensor region may be utilized to scan media sheets of relatively smaller size such as coins, negatives, stamps, slides and the like, thereby generating image data of manageable file size.

Figure 4:
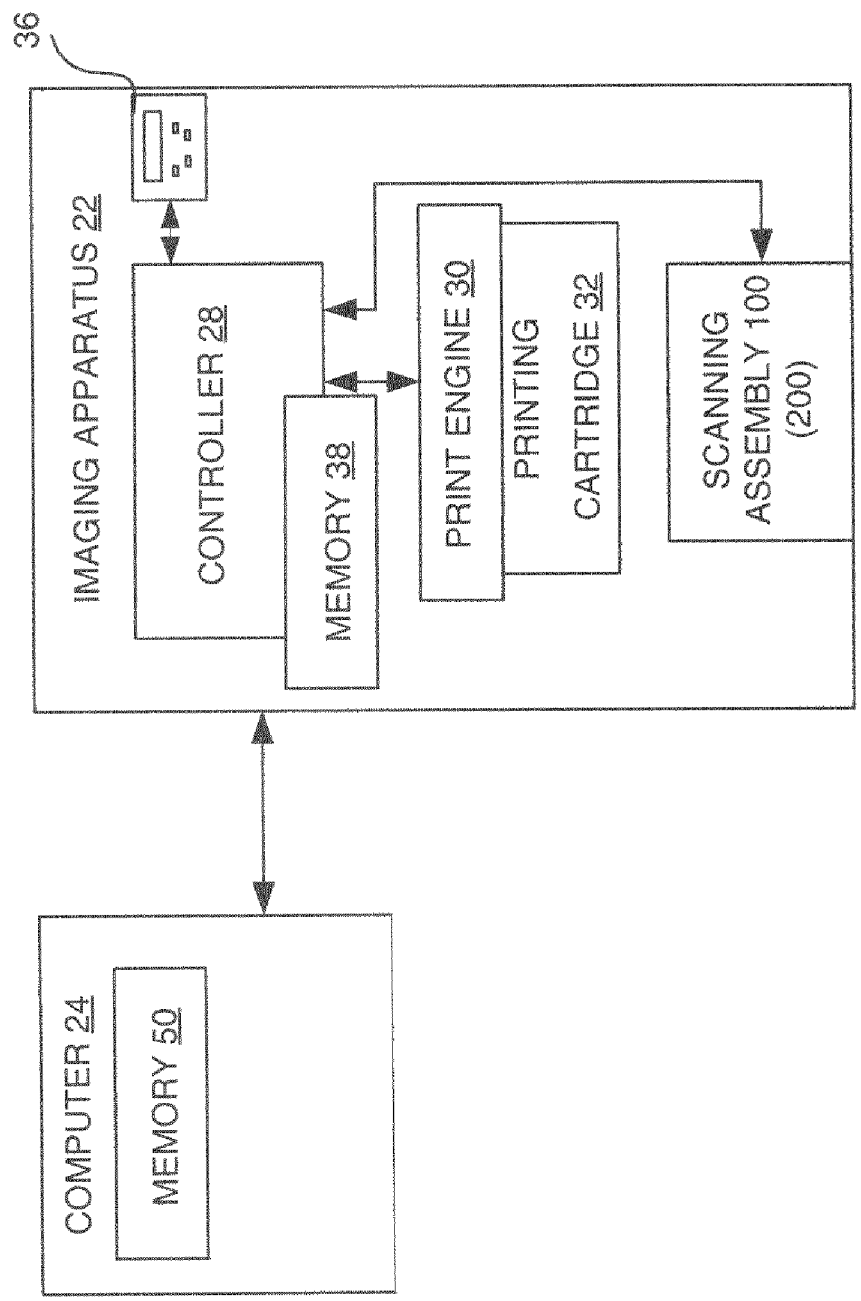
FIG. 4 is a block diagram of an imaging system in accordance with exemplary embodiments of the present disclosure.

It is understood that scanning assemblies 100 and 200 may be incorporated in imaging systems which perform functions in addition to image scanning. For example, scanning assemblies 100 and 200 may be included in an all-in-one (AIO) imaging apparatus 22 which performs image scanning, copying and facsimile transmitting and receiving. An exemplary AIO imaging apparatus 22 is shown in FIG. 4 and may include a printing mechanism for imparting marks to media, such as printing cartridge 32; a print engine 30 for positioning printing cartridge 32 relative to a sheet of media; scanning system 100 (200); user interface 36 for communicating information with a user; and system controller 28 which may be communicatively coupled to print engine 30, user interface 36 and scanning system 100 for controlling the operation of each. In addition, AIO imaging apparatus 22 may include a host port for communicating with a host computer 24.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A scan bar for scanning a media sheet in an image scanning device, the scan bar comprising:
    a sensor arrangement comprising a first sensor region and a second sensor region; and
    a lens arrangement positioned to focus light reflected from the media sheet onto the sensor arrangement,
    wherein each of the first sensor region and the second sensor region generates image data corresponding to the media sheet from the focused light received from the lens arrangement,
    wherein image data generated by the first sensor region is of relatively higher resolution than image data generated by the second sensor region, and
    wherein the reflected light is focused onto at least one of the first sensor region and the second sensor region based upon a target image file size.

2. The scan bar of claim 1 further comprising a light source positioned to illuminate the media sheet for reflecting the light from the media sheet onto the lens arrangement.

3. The scan bar of claim 1 wherein the first sensor region is positioned parallel to the second sensor region in a longitudinal direction of the scan bar.

4. The scan bar of claim 1 wherein a length of the first sensor region is less than a length of the second sensor region in a longitudinal direction of the scan bar.

5. The scan bar of claim 1 wherein the first sensor region and the second sensor region are positioned in a series arrangement along a longitudinal direction of the scan bar.

6. The scan bar of claim 1 wherein the image data generated by the first sensor region has a resolution that is at least twice a resolution of the image data generated by the second sensor region.

7. The scan bar of claim 1 wherein the lens arrangement comprises a first lens component in optical communication with the first sensor region and a second lens component in optical communication with the second sensor region.

8. The scan bar of claim 1 wherein the lens arrangement comprises a lens in optical communication with both the first sensor region and the second sensor region.

9. The scan bar of claim 1 wherein image data generated by the first sensor region has a resolution of about 4800 ppi and image data generated by the second sensor region has a resolution of no more than about 1200 ppi.

10. An image scanning device comprising:
    a scan bar for scanning a media sheet in the image scanning device, the scan bar comprising:
        a sensor arrangement comprising a first sensor region and a second sensor region;
        a lens arrangement positioned to focus light reflected from the media sheet onto the sensor arrangement, wherein each of the first sensor region and the second sensor region generates image data corresponding to the media sheet from the focused light received from the lens arrangement; and a control circuitry for selectively configuring at least one of the sensor arrangement and the lens arrangement to generate image data having a desired image resolution based upon a target file size, wherein the first sensor region generates image data at a first image resolution that is relatively higher than an image resolution of the second sensor region; and a motion mechanism for moving one of the scan bar and the media sheet relative to the other of the scan bar and the media sheet.

11. The image scanning device of claim 10 wherein the first sensor region is positioned parallel to the second sensor region in a longitudinal direction of the scan bar.

12. The image scanning device of claim 10 wherein a length of the first sensor region is less than a length of the second sensor region in a longitudinal direction of the scan bar.

13. The image scanning device of claim 10 wherein the first sensor region and the second sensor region are positioned in a series arrangement along a longitudinal direction of the scan bar.

14. The image scanning device of claim 10 wherein the lens arrangement comprises a first lens component in optical communication with the first sensor region and a second lens component in optical communication with the second sensor region.

15. The image scanning device of claim 10 wherein the lens arrangement comprises a lens in optical communication with both the first sensor region and the second sensor region.

16. A method for scanning a media sheet by a scan bar in an image scanning device, the method comprising:

receiving light reflected from the media sheet by a lens arrangement of the scan bar;

focusing the received light by the lens arrangement onto a sensor arrangement of the scan bar, the sensor arrangement comprising a first sensor region and a second sensor region, wherein each of the first sensor region and the second sensor region generates image data corresponding to the media sheet from the focused light received from the lens arrangement; and generating image data corresponding to the media sheet from the focused light received from the lens arrangement for scanning the media sheet, wherein image data generated by the first sensor region is of relatively higher resolution than image data generated by the second sensor region, wherein the reflected light is focused onto at least one of the first sensor region and the second sensor region based upon a target image file size.

17. The method of claim 16 wherein the first sensor region is positioned parallel to the second sensor region in a longitudinal direction of the scan bar.

18. The method of claim 16 wherein the first sensor region and the second sensor region are positioned in a series arrangement along a longitudinal direction of the scan bar.

19. The method of claim 16 wherein the image data generated by the first sensor region has a resolution that is at least twice a resolution of the image data generated by the second sensor region.

20. The image scanning device of claim 10 wherein the control circuitry selectively configures the image resolution of the first sensor region between the first image resolution and a second image resolution that is substantially the same as the image resolution of the second sensor region based upon the target image file size.

* * * * *